(12) United States Patent
Kawasaki et al.

(10) Patent No.: US 7,040,432 B2
(45) Date of Patent: May 9, 2006

(54) WIRE AND PIPE-LAYING STRUCTURE FOR FUEL CELL VEHICLE

(75) Inventors: Satoshi Kawasaki, Kawachi-gun (JP); Takanori Mouri, Kawachi-gun (JP)

(73) Assignee: Honda Motor Co., Ltd., Tokyo (JP)

( * ) Notice: Subject to any disclaimer, the term of this patent is extended or adjusted under 35 U.S.C. 154(b) by 75 days.

(21) Appl. No.: 10/703,648

(22) Filed: Nov. 6, 2003

(65) Prior Publication Data

US 2004/0094340 A1 May 20, 2004

(30) Foreign Application Priority Data

Nov. 11, 2002 (JP) ............................ P2002-326809

(51) Int. Cl.
*B60K 1/00* (2006.01)
(52) U.S. Cl. ............................. 180/65.1; 296/203.01; 280/834
(58) Field of Classification Search ................ 180/232, 180/274, 60, 291, 65.2, 65.3, 65.1; 280/831, 280/832, 834; 296/203.01, 204, 203.04, 296/209

See application file for complete search history.

(56) References Cited

U.S. PATENT DOCUMENTS

| | | | | |
|---|---|---|---|---|
| 4,810,597 A | * | 3/1989 | Kumagai et al. ............. 429/22 |
| 5,174,628 A | * | 12/1992 | Hayatsugu et al. ..... 296/187.11 |
| 5,195,780 A | * | 3/1993 | Inoue et al. ................. 280/834 |
| 5,641,031 A | * | 6/1997 | Riemer et al. ............. 180/65.3 |
| 5,794,979 A | * | 8/1998 | Kasuga et al. .............. 280/834 |
| 5,997,040 A | * | 12/1999 | Fukagawa et al. .......... 280/834 |
| 6,203,099 B1 | * | 3/2001 | Iwatsuki ..................... 296/204 |
| 6,227,610 B1 | * | 5/2001 | Iwatsuki et al. ............ 296/204 |
| 6,270,153 B1 | * | 8/2001 | Toyao et al. ................ 296/204 |
| 6,460,918 B1 | * | 10/2002 | Sato et al. ................... 296/204 |
| 6,595,581 B1 | * | 7/2003 | Wolkersdorfer et al. .... 296/204 |
| 6,619,729 B1 | * | 9/2003 | Kimura et al. ......... 296/203.03 |

FOREIGN PATENT DOCUMENTS

JP 08-192639 7/1996

* cited by examiner

*Primary Examiner*—Christopher P. Ellis
*Assistant Examiner*—Kelly E Campbell
(74) *Attorney, Agent, or Firm*—Hamre, Schumann, Mueller & Larson, P.C.

(57) ABSTRACT

A wire and pipe-laying structure for a fuel cell vehicle including a rear frame which is disposed at a back of the fuel cell vehicle and extends in a longitudinal direction of the fuel cell vehicle; a side sill which is disposed at a side of the fuel cell vehicle; and a floor frame which is disposed inside the side sill and extends in a longitudinal direction of the fuel cell vehicle. The floor frame together with the side sill are connected to a front end of the rear frame so as to form a Y-shaped frame having a crotch portion. A fuel pipe or a high-voltage wiring is disposed so as to pass through the crotch portion of the Y-shaped frame, and the fuel pipe or high-voltage wiring connects a fuel tank for fuel gas or a storage device to a fuel cell box.

2 Claims, 6 Drawing Sheets

US 7,040,432 B2

WIRE AND PIPE-LAYING STRUCTURE FOR FUEL CELL VEHICLE

Priority is claimed to Japanese application No. 2002-326809, filed Nov. 11, 2002, which is incorporated herein by reference.

BACKGROUND OF THE INVENTION

1. Field of the Invention

The present invention relates to a wire and/or pipe-laying structure for a fuel cell vehicle. In particular, the present invention relates to a wire and/or pipe-laying structure for a fuel cell vehicle capable of protecting a fuel pipe which connects a fuel cell box in which fuel cells are accommodated to a fuel cell tank in which fuel supplied to the fuel cells for generating power is stored, and/or protecting a high-voltage wiring which connects a storage battery, such as a capacitor, to a fuel cell box.

2. Description of Related Art

Among various types of vehicles, a fuel cell vehicle is known in which power is generated by reacting hydrogen, which is a fuel gas, with oxygen, which is an oxidant, and the power is utilized to drive a motor for running the vehicle.

In such a fuel cell vehicle, hydrogen, which is a fuel gas, is filled in a fuel tank, and is supplied to the fuel cell together with oxygen which is taken from the atmospheric air. Accordingly, it is necessary to connect the fuel tank for hydrogen to the fuel cell by using a fuel pipe.

Also, various proposals have been made for a fuel cell vehicle, for example, to provide a storage battery, such as a capacitor, and store power during a regenerative operation or assist the output of the fuel cell using the storage battery. In such cases, it is necessary to connect the high-voltage wiring from the storage battery to the fuel cell box.

On the other hand, various safety measures have been designed for a fuel cell vehicle, and for example, in Japanese Patent Application, First Publication, No. Hei 8-192639, a structure is disclosed in which the fuel cell itself crumples when the vehicle collides head-on.

However, in order to provide safety measures for collision for the fuel pipe and high-voltage wiring, it is necessary, for example, like for the above-mentioned fuel cell, to provide a protector for the fuel pipe and high-voltage wiring or to increase the strength and rigidity of a panel around the protector. Accordingly, it is inevitable that the weight of the vehicle is increased.

SUMMARY OF THE INVENTION

Accordingly, an object of the invention is to provide a wire and pipe-laying structure for a fuel cell vehicle by which wires, pipes, etc., are reliably protected by effectively utilizing a vehicle structure while avoiding an increase in the vehicle weight.

In order to achieve the above object, a first aspect of the present invention provides a wire and pipe-laying structure for a fuel cell vehicle, including: a rear frame (for instance, rear frames 13 and 14 explained in the following embodiment) which is disposed at a back of the fuel cell vehicle and extends in a longitudinal direction of the fuel cell vehicle; a side sill (for instance, side sills 70 and 80 explained in the following embodiment) which is disposed at a side of the fuel cell vehicle; a floor frame (for instance, floor frames 5 and 6 explained in the following embodiment) which is disposed inside the side sill and extends in a longitudinal direction of the fuel cell vehicle, the floor frame together with the side sill being connected to a front end of the rear frame so as to form a Y-shaped frame (for instance, Y-shaped frames 43 and 43 explained in the following embodiment) having a crotch portion; and a fuel pipe (for instance, a fuel pipe 49 explained in the following embodiment) or a high-voltage wiring (for instance, a high-voltage wiring 54 explained in the following embodiment) which is disposed so as to pass through the crotch portion of the Y-shaped frame, the fuel pipe or the high-voltage wiring connecting a fuel tank (for instance, hydrogen tanks 29 and 30 explained in the following embodiment) for fuel gas (for instance, hydrogen gas explained in the following embodiment) or a storage device (for instance, a capacitor 57 explained in the following embodiment) to a fuel cell box (for instance, a fuel cell box 39 explained in the following embodiment).

According to the above wire and pipe-laying structure for a fuel cell vehicle of the first aspect of the invention, the fuel pipe or the high-voltage wiring located at the Y-shaped frame is surrounded by the side sill and the floor frame. Accordingly, the side sill and the floor frame function as a protector during a vehicle collision, and it becomes possible to reliably prevent the fuel pipe and the high-voltage wiring from being damaged or disconnected. Also, since the fuel pipe and the high-voltage wiring are protected by effectively utilizing the vehicle body, it becomes possible to contribute the decrease in body weight as compared with the case in which a new reinforcing member is introduced.

A second aspect of the present invention provides a wire and pipe-laying structure for a fuel cell vehicle as set forth in the above first aspect, wherein the Y-shaped frame is formed at a right hand side and a left hand side of the fuel cell vehicle; the fuel tank and the storage device are disposed at the rear frame side; and the fuel pipe is allocated for the crotch portion of one of the right hand side and left hand side Y-shaped frames, and the high-voltage wiring is allocated for the crotch portion of the other one of the right hand side and left hand side Y-shaped frames.

According to the above wire and pipe-laying structure for a fuel cell vehicle of the second aspect of the invention, it becomes possible to separately maintain the fuel pipe and the high-voltage wiring. Accordingly, maintenance operation becomes easier to carry out as compared with a case in which both the fuel pipe and the high-voltage wiring are placed together.

A third aspect of the present invention provides a wire and pipe-laying structure for a fuel cell vehicle as set forth in the above second aspect, wherein a bent portion (for instance, bent portions 50 and 51 explained in the following embodiment) is provided with the fuel pipe and the high-voltage wiring located at the crotch portion.

According to the above wire and pipe-laying structure for a fuel cell vehicle of the third aspect of the invention, the fuel pipe and the high-voltage wiring can be elongated/contracted so as to correspond to external force applied to the fuel pipe or the high-voltage wiring. Accordingly, it becomes possible to reliably prevent the connecting portion of the fuel pipe and the high-voltage wiring from being damaged.

BRIEF DESCRIPTION OF THE DRAWINGS

Some of the features and advantages of the invention have been described, and others will become apparent from the detailed description which follows and from the accompanying drawings, in which.

DETAILED DESCRIPTION OF THE INVENTION

The invention summarized above and defined by the enumerated claims may be better understood by referring to the following detailed description, which should be read with reference to the accompanying drawings. This detailed description of particular preferred embodiments, set out below to enable one to build and use particular implementations of the invention, is not intended to limit the enumerated claims, but to serve as particular examples thereof.

Hereinafter, the wire and pipe-laying structure for a fuel cell vehicle according to an embodiment of the present invention will be described with reference to the accompanying drawings.

Figure 1:
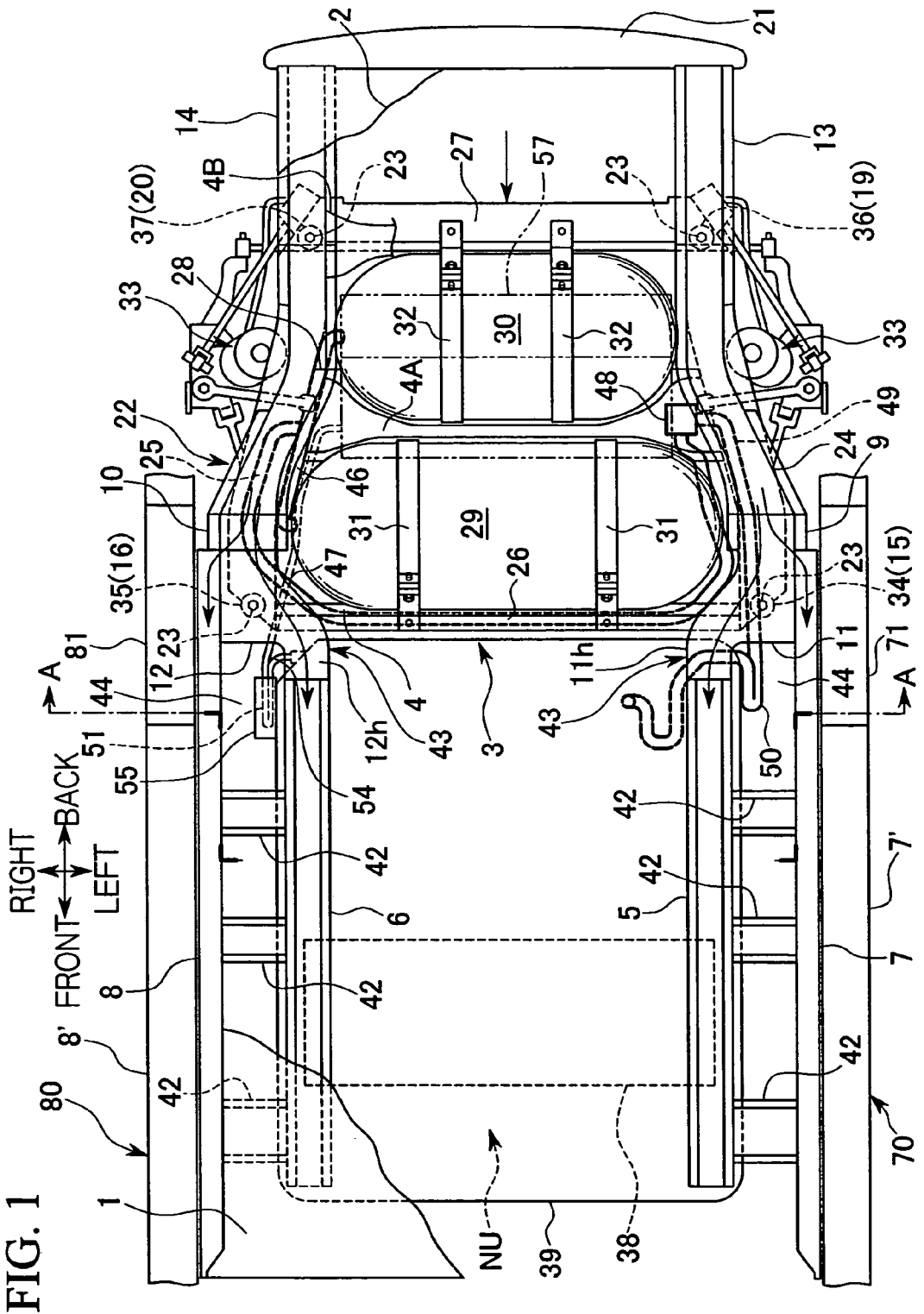
FIG. 1 is a diagram showing a plan view of a wire and pipe-laying structure for a fuel cell vehicle according to an embodiment of the present invention.
Figure 2:
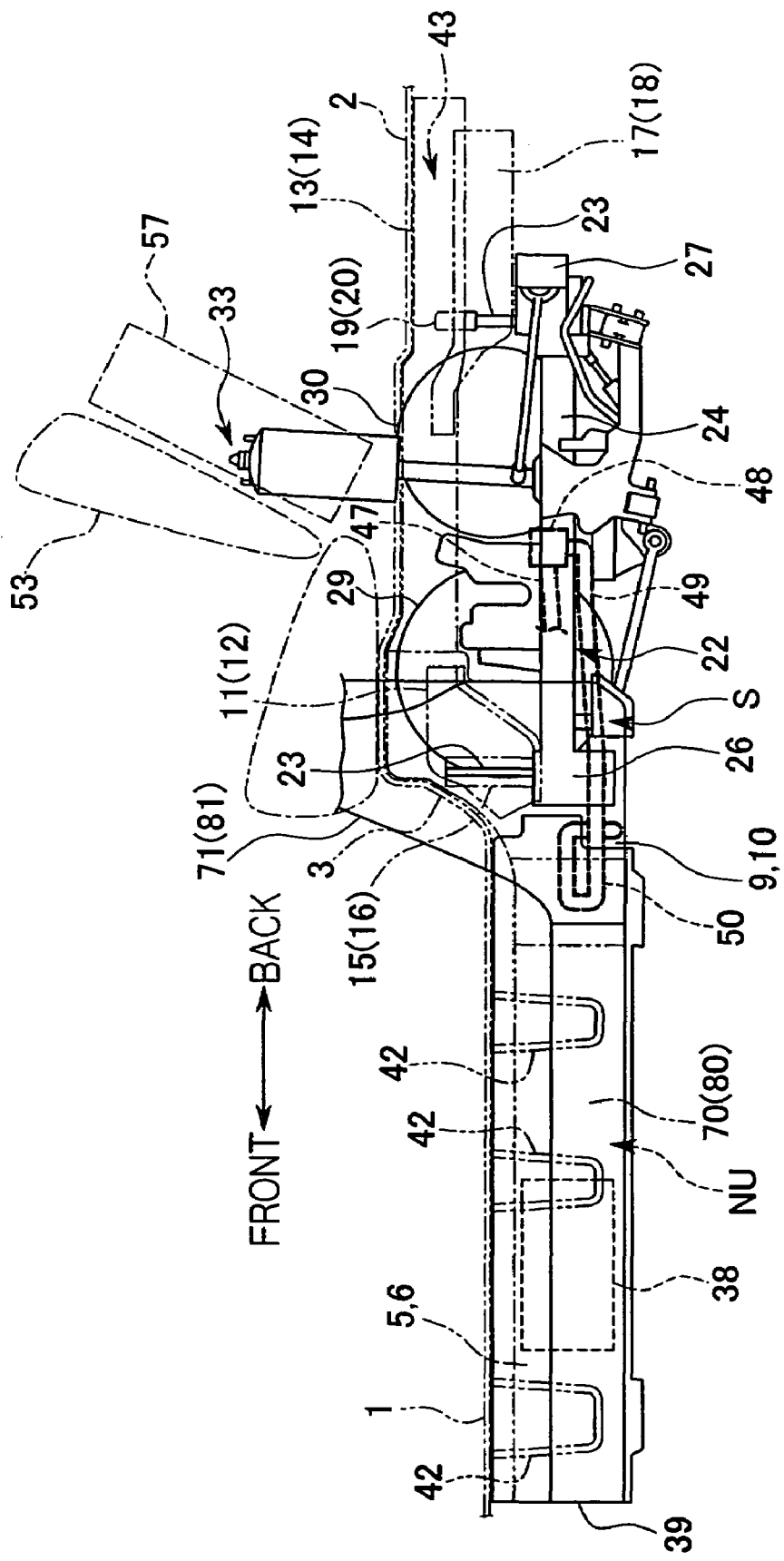
FIG. 2 is a diagram showing a side view of the wire and pipe-laying structure for a fuel cell vehicle shown in FIG. 1 according to the embodiment of the present invention.
Figure 3:
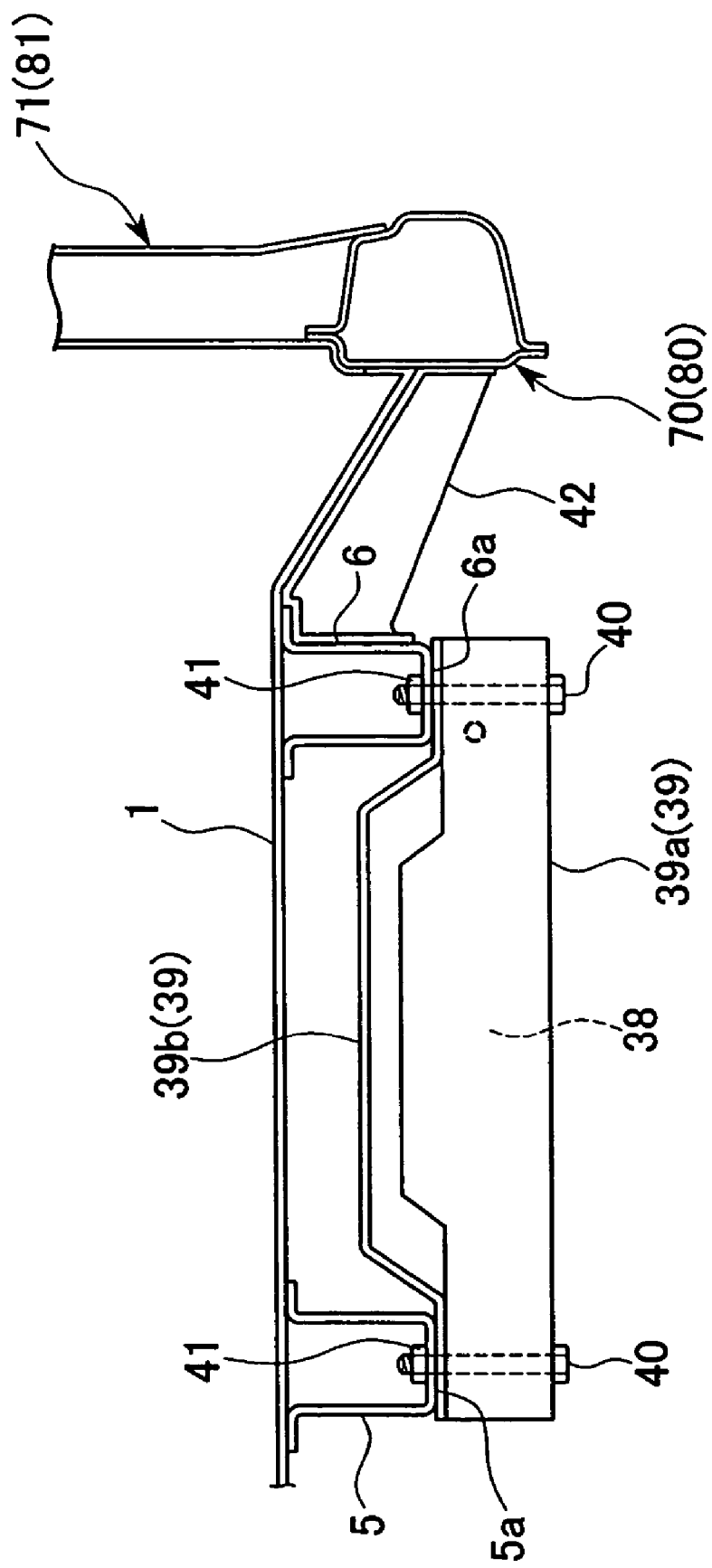
FIG. 3 is a diagram showing a cross-sectional view of the wire and pipe-laying structure for a fuel cell vehicle according to the embodiment of the present invention taken along the line A—A shown in FIG. 1.

As shown in FIGS. 1 through 3, a rear floor 2 having a step (shown in FIG. 2) which is formed so as to be uplifted at the back is joined to a rear end of a front floor 1.

A pair of right and left rear frames 13 and 14 is joined underneath the rear floor 2 in the backward and forward direction. Side sills 70 and 80 attached to the side periphery of the front floor 1, and the floor frames 5 and 6 disposed inside the side sills 70 and 80 along the backward and forward direction, are connected to the front end of the rear frames 13 and 14, respectively, via each of front brackets 11 and 12 so as to form a pair of right and left Y-shaped frames 43 and 43 below the floor. Note that a cross member 4 (shown in FIG. 1 only) is welded at the bottom of a step portion 3 of the rear floor 2 over the width direction of the vehicle.

In this embodiment, a pair of inside sills 7 and 8 are connected to the right and left hand side edge portions, respectively, of the front floor 1, and inside sill extensions 9 and 10 are attached to the rear edge portion of the inside sills 7 and 8, respectively. Also, outside sills 7' and 8' are welded to the inside sills 7 and 8, respectively, to form each of side sills 70 and 80.

Figure 4:
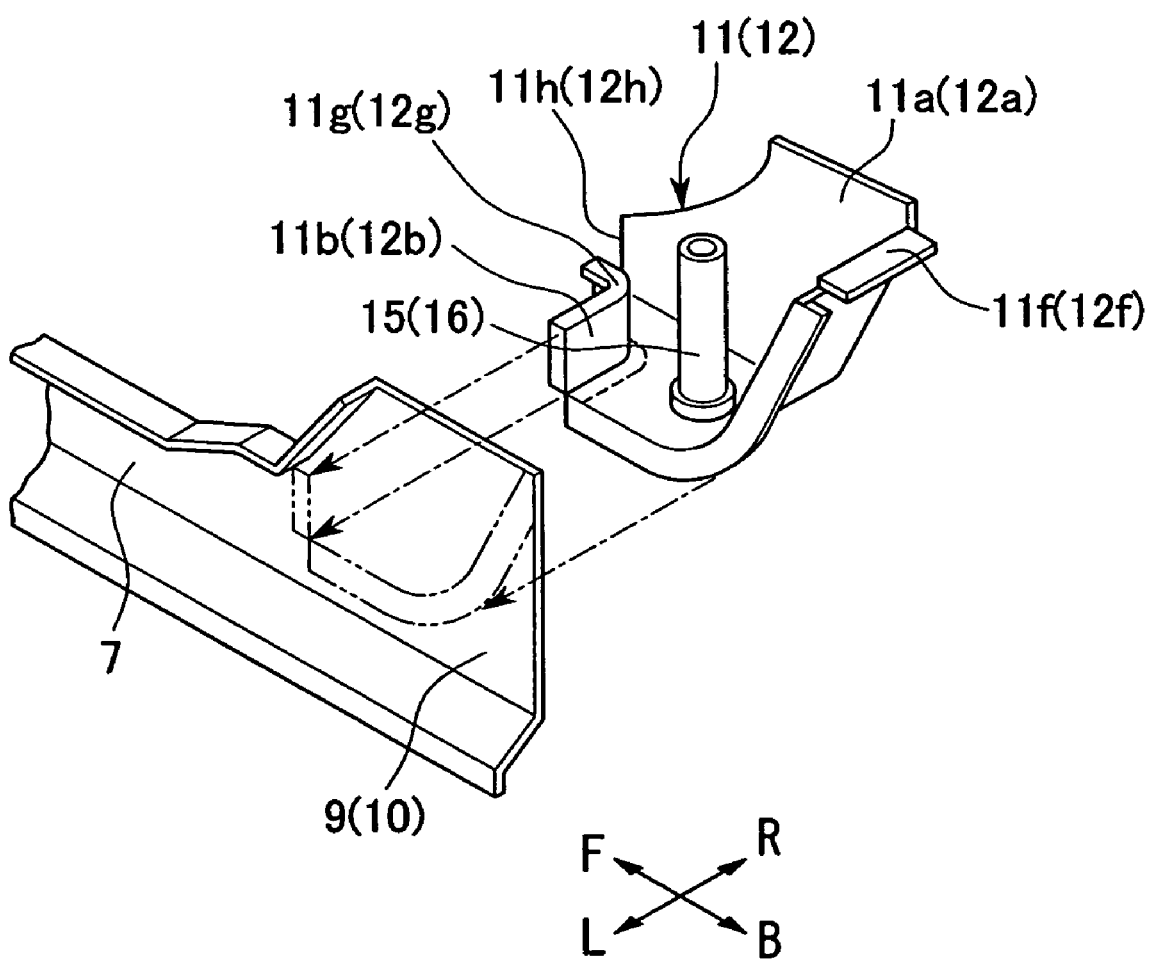
FIG. 4 is a diagram showing a perspective view of a front bracket which is used in an embodiment according to the present invention.

Next, front brackets 11 and 12 will be explained with reference to FIG. 4. The front brackets 11 and 12 are members for forming Y-shaped frames 43 and 43 by joining the side sills 70 and 80, more specifically the inside sill extensions 9 and 10 of the side sills 70 and 80, and the floor frames 5 and 6 to the front end of the above-mentioned rear frames 13 and 14. Note that in FIG. 4, only the inside sill extension 9 and the front bracket 11 located at the left hand side are shown, and the inside sill extension 10 and the bracket 12 are indicated by corresponding numerals shown in the brackets.

A flange portion 11f (12f) of rear upper end of the front bracket 11 (12) is attached to a bottom wall of a rear frame 13 (14), and a flange portion 11g (12g) is attached to a lower surface of the cross member 4. Also, a front wall 11b (12b) extends in a front direction together with an inner wall 11a (12a) to become a front frame connection portion 11h (12h) and is attached to the floor frame 5 (6). Moreover, a collar nut 15 (16) is provided with the bottom wall of the front bracket 11 (12).

Accordingly, a front end portion of the rear frame 13 (14) is connected to the side sill 70 (80) and the floor frame 5 (6) via the front bracket 11 (12).

As shown in FIG. 2, rear brackets 17 and 18 having cross-sections opened upwardly, are attached to the lower surface of the rear edge portion of the rear frames 13 and 14, respectively. Side walls of each of the rear brackets 17 and 18 are attached to the outside of side walls of the rear frames 13 and 14, and collar nuts 19 and 20 are provided with the bottom wall of the front portion.

In this embodiment, as shown in FIG. 1, two cross members 4A and 4B are provided so as to connect the left and right hand side rear frames 13 and 14, and a bumper beam 21 is attached to a rear edge portion thereof, i.e., to a rear edge of the rear brackets 17 and 18.

Also, a sub-frame 22 is fixed to the front brackets 11 and 12 and the rear brackets 17 and 18 by screwing a bolt 23 into each of the collar nuts 15, 16, 19, and 20 from the bottom. Note that in FIG. 2, only the fuel cell box 39, the sub-frame 22, and parts mounted thereon are shown in solid lines.

The sub-frame 22 includes a cross-beam 28 which is a member formed in a rectangular shape by right and left frame members 24 and 25 and front and back frame members 26 and 27 and extends in the width direction of the vehicle, and two hydrogen tanks 29 and 30 are disposed at a respective position separated by the cross-beam 28 being tightened and fixed by bands 31 and 32, respectively. Also, a suspension unit 33 is attached to the sub-frame 22, and a tire, which is not shown in the figure, is attached to the suspension unit 33.

In addition, insertions 34 and 35 for the bolts 23 which are inserted into the above collar nuts 15 and 16 are provided at corners formed by the front edge of the left and right frame members 24 and 25 and both ends of the front frame member 26. Likewise, insertions 36 and 37 for the bolts 23 which are inserted into the above collar nuts 19 and 20 are provided at corners formed by the rear edge of the left and right frame members 24 and 25 and both ends of the rear frame member 27.

Accordingly, the sub-frame 22 is fixed to the rear frames 13 and 14 by inserting the bolt 23 into each of the insertions 34, 35, 36, and 37 of the sub-frame 22 formed in the manner as mentioned above, and screwing the bolt 23 into the collar nuts 15, 16, 19, and 20, which are provided with the front brackets 11 and 12 and the rear brackets 17 and 18 of the rear frames 13 and 14.

As shown in FIG. 3, a fuel cell box 39, in which a fuel cell 38 and a fuel cell unit NU including accessories are accommodated, is disposed below the front floor 1 so as to extend over the above-mentioned left and right floor frames 5 and 6.

The fuel cell 38 generates power by reacting hydrogen, which is supplied from the above-mentioned hydrogen tanks 29 and 30, with oxygen, which is supplied from a compressor (not shown in the figures), and the fuel cell vehicle is driven by supplying the generated power to a motor (not shown in the figures) disposed at a front portion of the vehicle's body (which is also not shown in the figures).

The fuel cell box 39 includes a case main body 39a which covers the fuel cell unit NU, and a cover 39b disposed at the top. The case main body 39a and the cover 39b are fixed to the bottom surfaces 5a and 6a of the floor frames 5a and 6a by tightening bolts 40 to nuts 41 from a downward direction. Note that a center pillar 71 (81) is attached to the side sill 70 (80), and three brackets 42 at one side, hence six at both sides, are welded to portions between the left and right floor frames 5 and 6 and the inside sills 7 and 8.

As shown in FIGS. 1 and 2, the hydrogen tanks 29 and 30 are connected to a high-voltage mass piping 46 at the right hand side, and a fuel pipe 47 connected to the mass piping 46 extends along the inside of the frame member 25 of the sub-frame 22 to reach the front of the hydrogen tank 29 and is connected to a regulator 48 which is disposed between the frame members 26 and 24. A fuel pipe 49 which extends in a front direction from the regulator 48 is passed through a crotch portion 44 which is a space formed with the Y-shaped frame 43 at the left hand side so as to extend and cross over the sub-frame 22 and the fuel cell box 39 within the width thereof. The fuel pipe 49 is inserted into the fuel cell unit NU from the back of the left rear portion of the fuel cell box 39.

Figure 5:
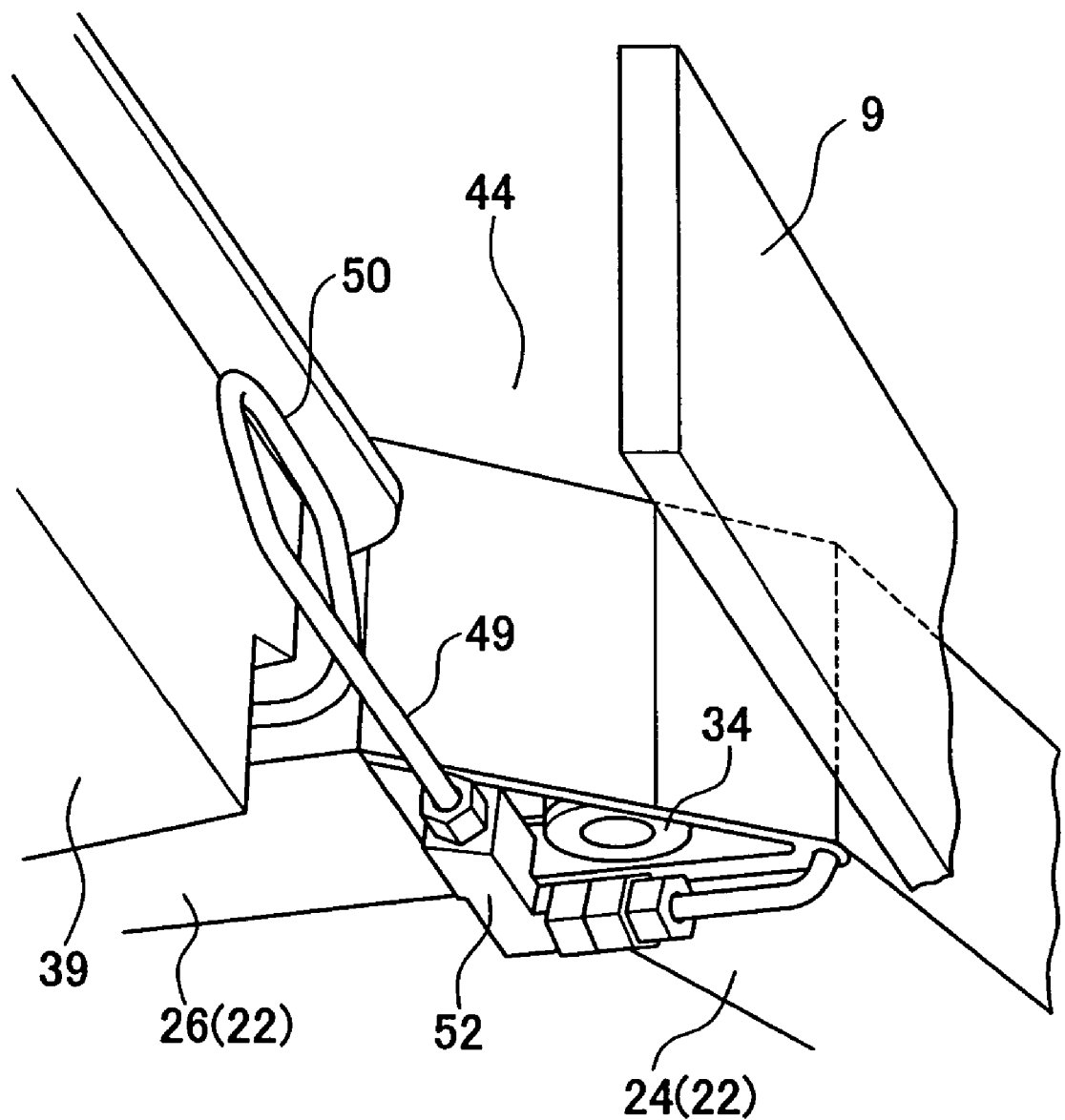
FIG. 5 is a diagram showing a perspective view of main parts at the left hand side in FIG. 1 of the wire and pipe-laying structure for a fuel cell vehicle according to an embodiment of the present invention.

FIG. 5 is a diagram showing a perspective view, from the left front side to the back, of the fuel cell box 39, the inside sill extension 9, and the sub-frame 22 (other members are omitted) in order to clearly show the placement of the fuel cell pipe 49 which is passed through the crotch portion 44 of the Y-shaped frame 43.

A joint member 52 is provided at the joint portion of the frame members 26 and 24 of the above-mentioned sub-frame 22, and the fuel pipe 49 is connected thereto. The fuel pipe 49 extends in the front direction, and subsequently extends in the upward direction to form a bent portion 50 of a loop shape in the vicinity of an outside wall of the floor frame 1 at the left hand side. The fuel pipe 49 is eventually inserted into the fuel cell box 39.

Also, as shown in FIGS. 1 and 2, a capacitor (a storage device) 57 is disposed at the back of a rear sheet 53 on the rear floor 2 together with a high-voltage unit. The capacitor 57 is used, for example, to store power generated by a motor during a regenerative operation at deceleration of the vehicle or to assist the output of the fuel cell 38. Accordingly, it is necessary to insert the high-voltage wiring 54 into the fuel cell box 39 in order to connect the high-voltage wiring 54 for the capacitor 57 to the motor.

The high-voltage wiring 54 from the capacitor 57 may be placed below the rear floor 2, and extends in the forward direction from the upper side of the sub-frame 22 so as to be passed through the crotch portion 44 of the Y-shaped frame 43 at the right hand side. The high-voltage wiring 54 is eventually inserted into the fuel cell unit NU from the back of the right rear portion of the fuel cell box 39.

Figure 6:
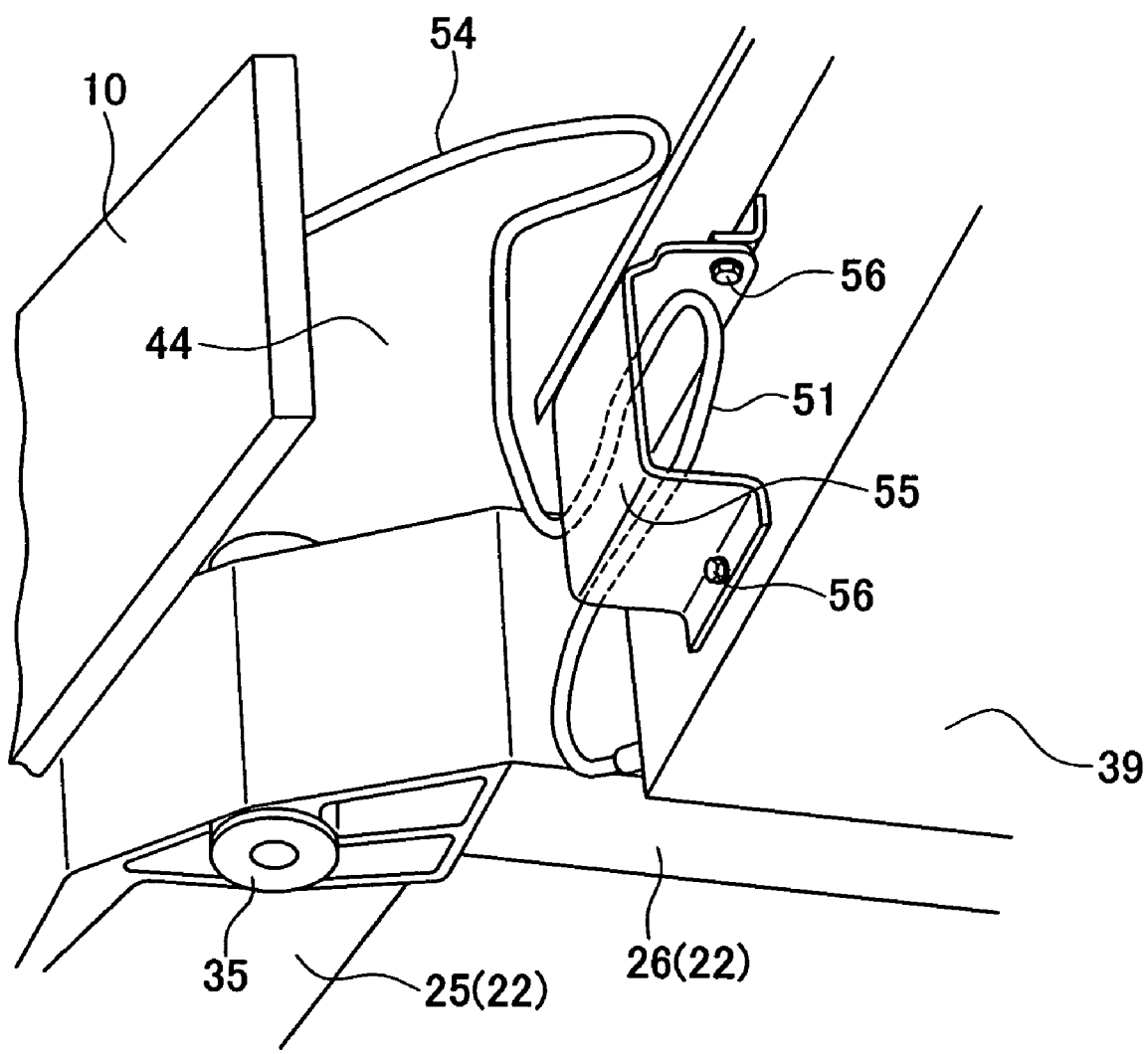
FIG. 6 is a diagram showing a perspective view of main parts at the right hand side in FIG. 1 of the wire and pipe-laying structure for a fuel cell vehicle according to an embodiment of the present invention.

FIG. 6 is a diagram showing a perspective view, from the right front side to the back, of the fuel cell box 39, the inside sill extension 10, and the sub-frame 22 (other members are omitted) in order to clearly show the placement of the high-voltage wiring 54 which is passed through the crotch portion 44 of the Y-shaped frame 43.

Here, at the crotch portion 44 of the Y-shaped frame at the right hand side, the high-voltage wiring 54 extends in the front direction, subsequently in the downward direction, and eventually in the backward direction to form a C-shaped bent portion 51 at a position in the vicinity of an outer wall of the floor frame 6 at the right hand side. The high-voltage wiring 54 is eventually inserted into the fuel cell box 39. Also, the cover 55 is fixed to the outside wall of the floor frame 6 by bolts 56 so that the bent portion 51 is placed and protected inside the space formed between the floor frame 6 and the outside wall.

Accordingly, the fuel pipe 49 and the high-voltage wiring 54 for the hydrogen tanks 29 and 30 and the capacitor 57 disposed at the rear frames 13 and 14 side are placed so as to be allocated for the crotch portion 44 of each of the right and left side Y-shaped frames 43.

According to the above embodiment, since the pair of right and left hand side Y-shaped frames 43 and 43 are formed, and the hydrogen tanks 29 and 30 and the capacitor 57 are disposed at the rear frames 13 and 14 side, and the fuel pipe 49 and the high-voltage wiring 54 connecting the hydrogen tanks 29 and 30 and the capacitor 57 to the fuel cell box 39 at the floor frames 5 and 6 side are passed through the crotch portion 44 of each of the Y-shaped frames 43, the fuel pipe 49 or the high-voltage wiring 54 placed at the crotch portion 44 of the Y-shaped frames 43 is surrounded by the side sills 70 and 80 and the floor frames 5 and 6. Accordingly, these side sills 70 and 80 and the floor frames 5 and 6 function as a protector when a vehicle collides, reliably preventing the fuel pipe 49 and the high-voltage wiring 54 from being damaged or disconnected.

That is, if an impulsive force in a forward direction is applied from a bumper beam when a vehicle is hit from behind, the force is divided and transmitted through each of the rear frames 13 and 14, the floor frames 5 and 6, and the side sills 70 and 80 as indicated by arrows in FIG. 1. Accordingly, portions around the crotch portion 44 are not deformed, and the fuel pipe 49 or the high-voltage wiring 54 will not be damaged. Also, if an impulsive force in a backward direction is applied when the vehicle collides head-on and the floor frames 5 and 6 and the side sills 70 and 80 are moved backwardly, the fuel pipe 49 and the high-voltage wiring 54 will not be damaged since neither the fuel pipe 49 nor the high-voltage wiring 54 will interact with the floor frames 5 and 6 and the side sills 70 and 80.

Moreover, for the case in which the vehicle is hit from a side direction, the degree of safety will be higher, as compared with a conventional structure, according to the present invention, since the fuel pipe 49 or the high-voltage wiring 54 is disposed at a position in the vicinity of the outside wall of the floor frames 5 and 6, and is separated from the side sills 70 and 80.

Accordingly, as explained above, since the fuel pipe 49, the high-voltage wiring 54, etc., can be reliably protected by effectively utilizing a body structure, it becomes possible to contribute to the reduction of body weight without adding reinforcing members which would increase the body weight.

Furthermore, since both the hydrogen tanks 29 and 30 and the capacitor 57 are disposed at the above-mentioned rear frames 13 and 14 side and the fuel pipe 49 and the high-voltage wiring 54 may be allocated for the crotch portion 44 of each of the right and left hand side frames 44, it becomes easy to handle the fuel pipe 49 and the high-voltage wiring 54 and the two can be separately maintained. As a result, a maintenance operation can be performed in an easier manner as compared to a case in which the fuel pipe 49 and the high-voltage wiring 54 are placed at the same side. Also, since the fuel pipe 49 and the high-voltage wiring 54 are separately placed at each side, reliability in operation as well as connection increases, improving quality.

In addition, since the bent portions 50 and 51 are provided with the fuel pipe 49 and the high-voltage wiring 54 at the above-mentioned crotch portion 44, the fuel pipe 49 and the high-voltage wiring 54 can be elongated/contracted at the bent portions 50 and 51 so as to correspond to the shift of the fuel cell box 39 and the hydrogen tanks 29 and 30 when an external force is applied thereto. Accordingly, it becomes possible to reliably prevent the connection portion of the fuel pipe 49 and the high-voltage wiring 54, i.e., the joint portion 53 for the high-voltage wiring 54, for example, from being damaged.

Note that the present invention is not limited to the above-mentioned embodiment in which, for example, the capacitor 57 is used as a storage device, and it may be applied to a case in which a chargeable/dischargeable battery is employed.

Having thus described exemplary embodiments of the invention, it will be apparent that various alterations, modifications, and improvements will readily occur to those skilled in the art. Such alterations, modifications, and improvements, though not expressly described above, are nonetheless intended and implied to be within the spirit and scope of the invention. Accordingly, the foregoing discussion is intended to be illustrative only; the invention is limited and defined only by the following claims and equivalents thereto.

What is claimed is:

1. A wire and pipe-laying structure for a fuel cell vehicle, comprising:
    a rear frame which is disposed at a back of said fuel cell vehicle and extends in a longitudinal direction of said fuel cell vehicle;
    a side sill which is disposed at a side of said fuel cell vehicle;
    a floor frame which is disposed inside said side sill and extends in a longitudinal direction of said fuel cell vehicle, said floor frame together with said side sill being connected to a front end of said rear frame so as to form a Y-shaped frame having a crotch portion, and
    a fuel pipe or a high-voltage wiring which is disposed so as to pass through said crotch portion of said Y-shaped frame, said fuel pipe or said high-voltage wiring connecting a fuel tank for fuel gas or a storage device to a fuel cell box, wherein
    said fuel tank for fuel gas is supported by a sub-frame which is connected to an underside of said rear frame, said fuel tank being positioned under a rear floor;
    said fuel cell box is disposed under said floor frame under a front floor, said front floor being positioned lower than said rear floor, and
    said fuel pipe extends horizontally from an underside of said sub-frame in a front direction, said fuel pipe having at least one loop in said crotch portion formed by said Y-shaped frame and being connected to said fuel cell box.

2. A wire and pipe-laying structure for a fuel cell vehicle according to claim 1, wherein
    said Y-shaped frame is formed at a right hand side and a left hand side of said fuel cell vehicle;
    said fuel tank and said storage device are disposed at said rear frame side; and
    said fuel pipe is allocated for said crotch portion of one of said right hand side and left hand side Y-shaped frames, and said high-voltage wiring is allocated for said crotch portion of the other one of said right hand side and left hand side Y-shaped frames, wherein
    said storage device is disposed on said rear floor,
    said high-voltage wiring extends into the crotch portion of one of said Y-shaped frames, said high-voltage wiring having at least one bent portion, and
    said bent portion is covered with a cover.

* * * * *